United States Patent [19]
Gnaedinger et al.

[11] 3,717,805
[45] Feb. 20, 1973

[54] ELECTRICAL POWER CENTER FOR RECREATIONAL VEHICLES

[75] Inventors: Donald J. Gnaedinger; Gerald E. Staley, both of Highland, Ill.

[73] Assignee: Basler Electric Company, Highland, Ill.

[22] Filed: July 9, 1971

[21] Appl. No.: 161,156

[52] U.S. Cl. ............... 321/8 R, 307/150, 307/151, 317/99, 317/100, 317/120, 321/8 C
[51] Int. Cl. .......................................... H02m, H02b
[58] Field of Search ............... 321/8, 8 C, 317/99, 100, 101 DH, 317/120, 122; 307/150, 151, 155; 321/14

[56] References Cited

UNITED STATES PATENTS

| | | | |
|---|---|---|---|
| 2,265,544 | 12/1941 | Peters | 321/8 R |
| 2,721,946 | 10/1955 | Weisberger et al. | 321/8 R |
| 2,028,191 | 1/1936 | Chereton | 321/8 R |
| 3,448,346 | 6/1969 | Webb | 317/122 |
| 3,085,224 | 4/1963 | Becka | 317/120 |
| 2,485,450 | 10/1949 | Kotterman | 321/8 R |
| 3,257,602 | 6/1966 | Potter et al. | 321/8 R |

Primary Examiner—William H. Beha, Jr.
Attorney—Koenig, Senniger, Powers and Leavitt

[57] ABSTRACT

An electrical power center for recreational vehicles comprising a cabinet which is adapted to be framed in the interior structure of a recreational vehicle and which has a circuit breaker box and a power converter unit mounted therewithin. The power converter unit may be conveniently removed from the cabinet for servicing. This converter unit includes a stepdown transformer and means for rectifying the output of the secondary of the transformer for supplying low voltage d.c. to various d.c. loads in the recreational vehicle. The converter unit is connected to the circuit breaker box by a flexible, detachable input cable to supply a.c. power thereto and is connected to the d.c. loads by flexible output cables for supplying low voltage d.c. thereto. These input and output cables are of sufficient length to permit substantial removal of the power converter unit from the cabinet. The output cables connected to receptacles which are removably mounted in a side wall of the cabinet for interconnection to the various d.c. loads by conventional plug and cable connectors.

9 Claims, 6 Drawing Figures

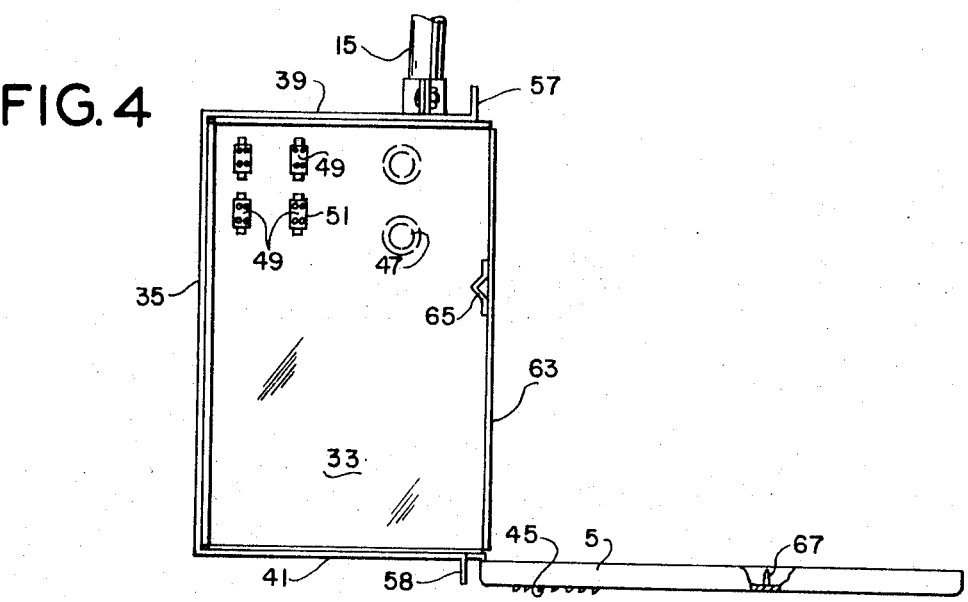
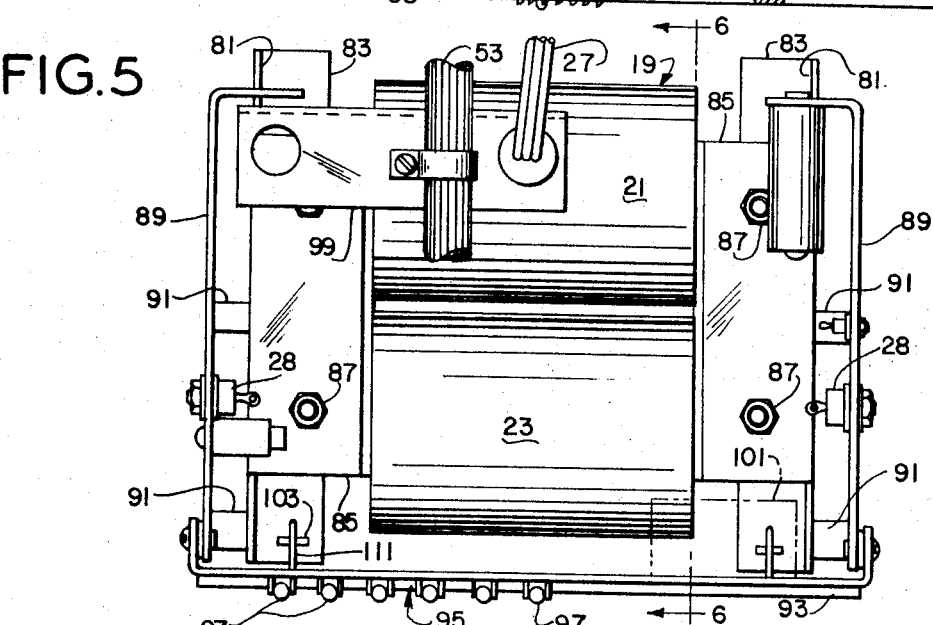
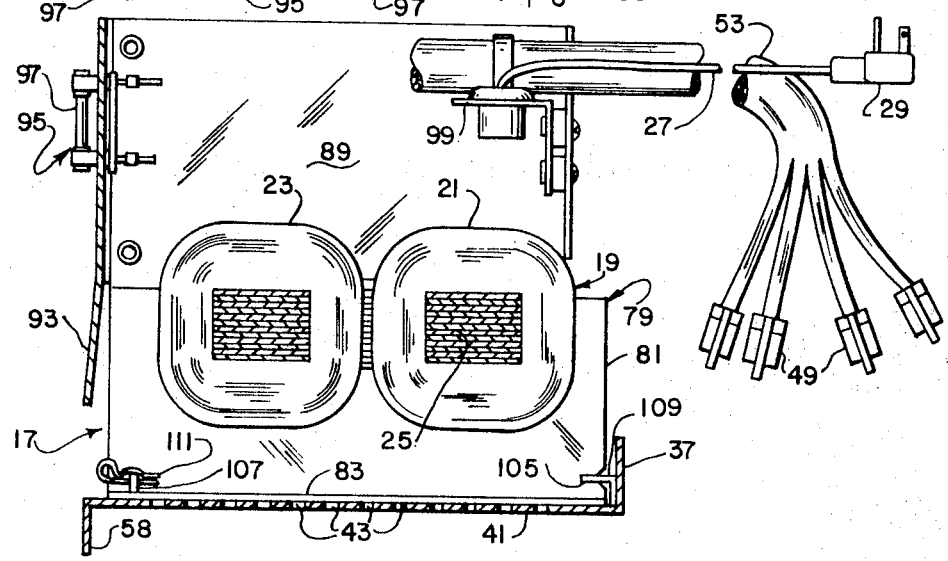

ELECTRICAL POWER CENTER FOR RECREATIONAL VEHICLES

BACKGROUND OF THE INVENTION

This invention relates to electrical power systems and more particularly to an electrical power system for use in a recreational vehicle (e.g., a mobile home, motor home, houseboat, etc.).

Recreational vehicles, especially the larger and more expensive models, have many lights and small electric appliances which operate from a 12 volt d.c. power source and have larger appliances such as air conditioners and refrigerators which operate on 120 volt a.c. power. These recreational vehicles have a power converter unit for stepping down and rectifying a.c. power supplied from an external a.c. source (an outlet provided at a trailer site, for example) for supplying the above-mentioned d.c. loads with low voltage d.c., and they have an onboard 12 volt battery for supplying d.c. when the vehicle is not connected to an external a.c. power source. The electrical systems of these recreational vehicles generally include circuit breakers to provide overload protection for the power converter unit and for the other a.c. circuits in the vehicle, and they also include fuses to protect the various d.c. loads from overcurrent. However, these circuit breakers and fuses are typically located at different and often widely separated locations within the recreational vehicle whereby an electrical malfunction causes much inconvenience to the owner or operator of the vehicle because he must go to various different locations within the vehicle to find the blown fuse or open breaker. Furthermore, the widely separated locations of the components of the electrical power system make fabrication of the recreational vehicle more difficult and expensive.

SUMMARY OF THE INVENTION

Among the many objects of this invention may be noted the provision of an electrical power center for a recreational vehicle in which the necessary components are located within a central cabinet, i.e., such a power center which is unitary; the provision of such a power center which is easy to install in the vehicle and which is adapted to be readily connected to the wiring within the vehicle; the provision of such a power center in which the power converter unit is readily removable from the cabinet for servicing; and the provision of such a power center which is of economical construction. Other objects and features will be in part apparent and in part pointed out hereinafter.

Briefly, an electrical power center of this invention for use in a recreational vehicle comprises a cabinet which has a front door. An a.c. circuit breaker box is mounted in the cabinet, preferably at the top thereof, and with a space below the box constituting a compartment for an a.c. power converter unit. The circuit breaker box is connected to an external a.c. power source by an a.c. power cable. The power converter unit includes a stepdown transformer and has means for rectifying the output of the secondary of the transformer to provide low voltage d.c. power. The converter unit is removably mounted in the compartment and may conveniently be pulled out of the compartment for servicing. The a.c. circuit breaker box is connected to the power converter unit by a detachable flexible input cable to supply a.c. power to the converter unit. This last-said cable is of sufficient length to permit substantial removal of the converter unit from the compartment. A receptacle is removably mounted in a wall of the cabinet and a flexible, detachable output cable extends from the converter unit to the receptacle for supplying d.c. power thereto. The output cable is of sufficient length to permit substantial removal of the converter unit from the compartment. The receptacle supplies low voltage d.c. power to various d.c. loads within the recreational vehicle and these d.c. loads are connected to the receptacle by plug and cable conductors.

BRIEF DESCRIPTION OF THE DRAWINGS

FIG. 4 is a left side elevation with the front door open;

FIG. 5 is an enlarged plan view of the power converter unit; and

FIG. 6 is a vertical section on line 6—6 of FIG. 5.

Corresponding reference characters indicate corresponding parts throughout the several views of the drawings.

DESCRIPTION OF THE PREFERRED EMBODIMENT

Figure 3:
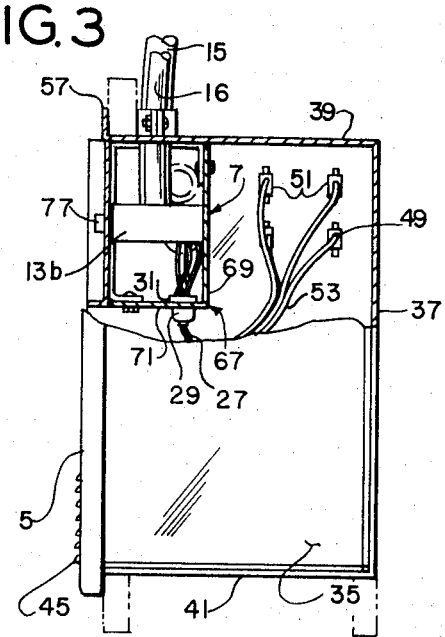
FIG. 3 is a vertical section on line 3—3 of FIG. 2.

Referring to the drawings, an electrical power center indicated in its entirety at 1 for a recreational vehicle (e.g., a motor home, camper, houseboat or the like) is shown to comprise a cabinet, generally indicated at 3, having a front door 5 which is hinged at its bottom to open downwardly. The cabinet is adapted to be framed into the interior structure of a recreational vehicle whereby the front door is substantially flush with an interior wall of the recreational vehicle when the door is closed. The cabinet further includes a circuit breaker box 7 (as shown in FIG. 3) mounted in the cabinet at the top front thereof with a space in the cabinet below the box constituting a compartment, generally indicated at 9, for an a.c. power converter unit 11. Box 7 houses one or more a.c. circuit breakers 13a and 13b which are connected to an external a.c. power source (e.g., an outlet provided at a trailer site or dock site) by an a.c. power supply cable 15. These circuit breakers interrupt the current supplied to their respective loads in the event the current exceeds a predetermined value. Circuit breaker 13a provides overload protection to converter unit 11 and the other circuit breaker 13b is connected to other a.c. loads in the recreational vehicle e.g., air conditioners, refrigerators or the like) by means of a cable 16. Thus, all the circuit breakers used in the recreational vehicle are centrally located in the electrical power center.

Figure 1:
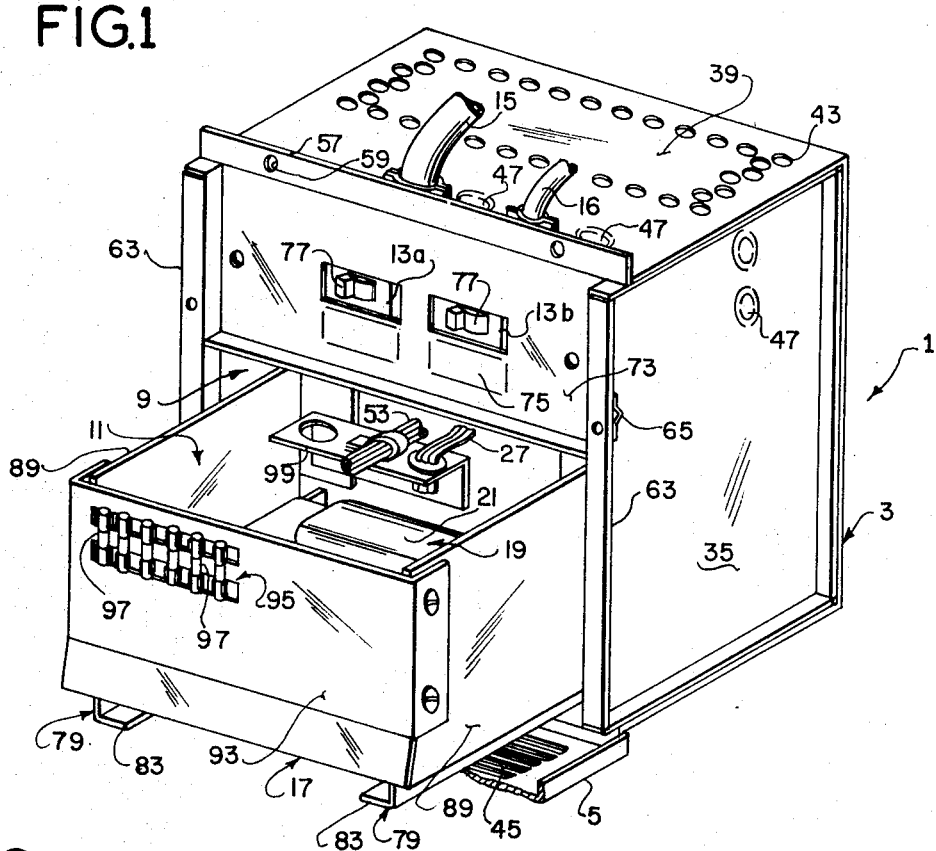
FIG. 1 is a perspective view of an electrical power center of this invention showing its front door open and its power converter unit pulled out for servicing.

More particularly, the a.c. power converter unit 11 comprises a chassis, generally indicated at 17, carrying a stepdown transformer 19 which has a primary coil 21 and a secondary coil 23 surrounding opposite legs of a laminated core 25, these coils and core constituting a core and coil unit. The converter unit also includes diodes 28 for rectifying the output of secondary coil 23 to provide low voltage d.c. to various low voltage d.c. loads in the vehicle (for example, lights, radio, water pump, etc.). Recreational vehicles are conventionally provided with a storage battery (not shown) for supplying low voltage d.c. to the d.c. loads when an external a.c. power source is not available. As shown in FIG. 1, power converter unit 11 on its chassis 17 is removably mounted in compartment 9 generally below circuit breaker box 7 and is adapted to be pulled out of the compartment after opening of front door 5 for servicing. The converter unit may also include a conventional battery charging circuit (not shown) for recharging the above-mentioned storage battery.

A.c. power is supplied, via circuit breaker 13a, to power converter unit 11 by a detachable, flexible input cable 27 and a receptacle 31. This interconnecting cable is of sufficient length to permit substantial removal of the converter unit from compartment 9 and it has a conventional grounded plug 29 on its free end which may be unplugged from receptacle 31 mounted in the bottom of circuit breaker box 7 to permit complete removal of the converter unit from the cabinet.

Cabinet 3 is a box-like structure having side walls 33 and 35, a back wall 37, a top wall 39, and a bottom wall 41. Top and bottom walls 39 and 41 are each provided with air cooling holes 43 for permitting cooling air to enter the cabinet from the bottom, to circulate around the various components in converter unit 11 for cooling purposes, and to exhaust from the top of the cabinet. Cooling louvers 45 are provided in the lower portion of door 5 to aid in cooling the power converter. Top wall 39 and side walls 33 and 35 have a plurality of knock-out plates 47 which may readily be removed for providing openings through which additional a.c. output cables may pass for connection to additional a.c. circuit via additional breakers (not shown).

As shown in FIGS. 3 and 4, four snap-in receptacles 49 are mounted in openings 51 in the upper rear corner of side wall 33. Each of these snap-in receptacles is interconnected to the converter unit by the conductors of a flexible output cable 53 to supply low voltage d.c. to the receptacles. Three of the receptacles 49 are adapted to be connected to different d.c. loads to supply these d.c. loads with low voltage d.c. current from the converter unit. One of the receptacles is provided for connection to the storage battery (not shown) for supplying these d.c. loads with low voltage d.c. when an a.c. power source is not available and for recharging the battery when the power converter is connected to an external a.c. power source. The d.c. loads and the battery are connected to receptacles 49 by conventional plug and cable connectors 55.

Top wall 39 and bottom wall 41 each have respective upwardly and downwardly extending flanges 57 and 58 which are bent from their respective forward ends to facilitate framing of cabinet 3 within the recreational vehicle. Mounting holes 59 are provided in these flanges for securing the cabinet to vehicle framing members (shown in phantom in FIG. 3). Front door 5 is attached to the front edge of bottom wall 41 by a hinge 61. Side walls 33, 35 each have outwardly extending flanges 63 bent from their forward ends and these flanges carry frictional clasps 65 for engaging latching pins 67 carried by door 5 for releasably securing the door in its closed position.

As shown in FIG. 3, circuit breaker box 7 is formed of an L-shaped member generally indicated at 67 having a vertical leg 69 which constitutes the back wall of the box and a horizontal leg 71 which constitutes the bottom wall of the box. Member 67 extends between side walls 33 and 35 whereby the front portion of top wall 39 constitutes the top of box 7 and the upper front portions of the side walls constitute its ends. Circuit breakers 13a, b are secured to the back wall 69 of the box whereby the a.c. power supply cable 15 and a.c. output cable 16 may be readily connected thereto. The front of circuit breaker box 7 is closed off by a removable front panel 73 which has a plurality of knock-out plates 75 for providing openings through which the circuit breaker switch levers (i.e., the resetting levers) 77 may protrude. Receptacle 31 is mounted in an opening in bottom wall 65 of the circuit breaker box 7 which constitutes a panelboard.

Figure 2:
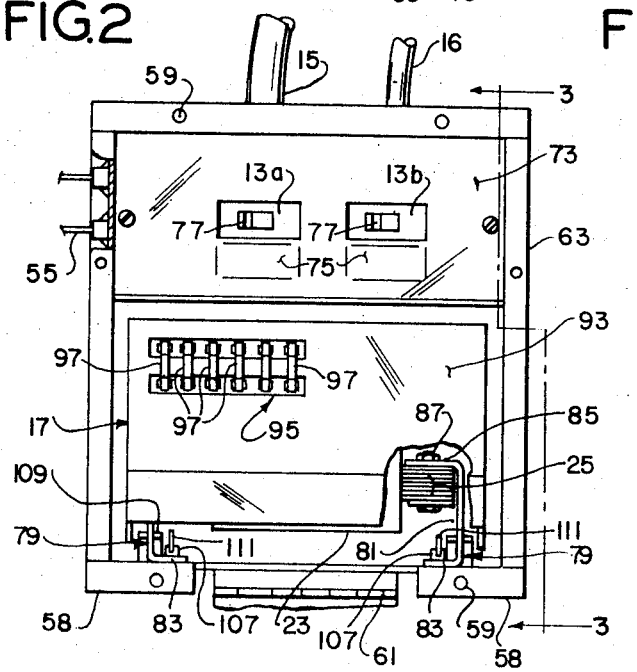
FIG. 2 is a front elevation of the power center with the door removed and with parts broken away.

Power converter chassis 17 comprises a pair of inwardly facing channel-shaped mounting members, generally indicated at 79, each having a vertical web 81, an inwardly extending lower flange 83 and an inwardly extending upper flange 85. The upper flange 85 of each channel member is secured to the outer end of core 25 by bolts 87 whereby the channel members constitute a frame for the transformer core and coil unit. As shown in FIG. 2, webs 81 extend down below the core and coil unit, and lower flanges 83 bear on cabinet bottom wall 41 for supporting converter unit 11 in an installed position (as shown in FIGS. 2 and 6) within the cabinet. Lower flanges 83 also serve as runners for sliding the converter unit from its installed position in a manner as will appear. The channel members and the core form a rigid base on which the other members of the chassis and components of the converter unit are supported.

Chassis 17 further comprises a side plate 89 at each end of transformer 19, these side plates being spaced apart and electrically insulated from channel members 79 by insulated spacers 91. Side plates 89 have diodes 28 secured thereto and are made of aluminum or other material having a relatively high thermal conductivity to serve as heat sinks for the diodes. A front panel 93 is secured to the forward ends of side plates 89 for closing off the front end of the chassis. Front panel 93 carries a central fuse panel 95 having a plurality of fuses 97 releasably held thereon, there being one fuse 97 for overload protection in each d.c. circuit which is supplied by the power converter unit. A support bracket 99 is secured to one of the side plates 89 (the left side plate as viewed in FIG. 5) for supporting and providing strain relief for interconnecting cable 27 and flexible output cables 53. A relay 101 (shown in phantom in FIG. 5) is secured to the back face of front panel 93. This relay functions to automatically switch the converter unit from battery power to rectified low voltage d.c. power for supplying the various d.c. loads in the recreational vehicle whenever the power converter unit is connected to an external a.c. power source and to automatically switch back to battery power whenever the a.c. source is disconnected.

As best shown in FIGS. 5 and 6, a slot is provided in the forward end of each lower leg 83 and a horizontal notch 105 is provided in the lower rear portion of the web member 81 of each of the channel members 79. Studs 107 are secured to the upper face of bottom wall 41 and are adapted to extend upwardly through slots 103. Lugs 109 are secured to the lower portions of back wall 37 and are adapted to engage notches 105. Studs 107 have holes therethrough for receiving clasp pins 111 for positively holding lower flanges 83 on the studs when the recreational vehicle is underway. Slots 103 and notches 105 together with studs 107 and lugs 109 constitute quick-release means for positively holding converter unit 11 in its installed position and for permitting removal of the converter unit from the cabinet.

Converter unit 11 may be readily removed from compartment 9 for servicing by opening front door 5, and by quickly removing pins 111 from holes for the pins in studs 107, lifting the forward end of chassis 17, and then pulling forward on the chassis to slide it out of compartment 9 to the position shown in FIG. 1. Vertical clearance is provided between the lower portion of circuit breaker box 7 and the upper portion of converter unit 11 to permit the converter unit to be lifted a distance sufficient for slots 103 in lower flanges 83 to clear studs 107. With the converter unit substantially removed from compartment 9 (as shown in FIG. 1), it may be completely removed from the cabinet by unplugging plug 29 from receptacle 31, by removing receptacles 49 for openings 51 in side wall 33, and by lifting the converter unit clear of the cabinet.

It will be noted that all circuit breakers for the a.c. circuits and all fuses for the d.c. circuits are centrally located within the electrical power center of this invention thus making it more convenient for the owner of the vehicle to locate an open circuit breaker or a blown fuse and to restore power. Furthermore, the centralized location of the electrical components within the power center of this invention enables rapid and economical wiring of the vehicle during manufacture by permitting the use of standardized wiring harnesses.

In view of the above, it will be seen that the several objects of this invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A unitary power center for recreational vehicles comprising:

a cabinet having a front door, top and bottom walls, and flange means for mounting the cabinet within a recreational vehicle with said front door substantially flush with an interior surface of the recreational vehicle;

an a.c. circuit breaker box mounted in the cabinet with a space remaining in the cabinet, said space constituting a compartment for an a.c. converter unit, said box adapted to be connected to an a.c. power cable for connection to an external a.c. power source, said box including a front panel closing the box and including a plurality of a.c. circuit breakers each resettable from the front panel;

an a.c. converter unit comprising a chassis carrying a stepdown transformer and means for rectifying the output of said transformer to provide low-voltage d.c., said unit being removably mounted in said compartment and adapted for being pulled out of said compartment after opening of said door;

said a.c. circuit breaker box being interconnected by a detachable flexible input cable to said unit to supply a.c. power thereto, said cable being of sufficient length to permit substantial removal of said converter unit from the compartment and subsequent disconnection of said interconnecting cable;

a receptacle removably mounted in a wall of the cabinet;

a flexible, detachable output cable extending from the converter unit to said receptacle and supplying low-voltage d.c. power thereto, said output cable being of sufficient length to permit substantial removal of said converter unit from said compartment, said receptacle adapted to supply low-voltage d.c. power via respective d.c. circuits to various d.c. loads carried by the recreational vehicle and interconnected to said receptacle by plug and cable conductors; and means, mounted within said cabinet and accessible when said front door is open, for breaking such d.c. circuit in response to overload in the respective d.c. circuit.

2. A unitary electrical power center as set forth in claim 1 wherein said circuit breaker box is mounted within the cabinet at the top thereof, and said compartment is below the box whereby said converter unit is supported by a bottom wall of said cabinet.

3. A unitary electrical power center as set forth in claim 2 having quick-release means for positively holding said converter unit in an installed position within said compartment and quickly releasable for readily permitting removal of the converter unit from the cabinet.

4. A unitary electrical power center as set forth in claim 2 wherein said transformer includes a core and coil unit supported on a frame, said frame having a pair of mounting members secured to and extending below said core and coil unit for supporting said converter unit in its installed position within said compartment, each mounting member having a vertical web extending down from said core and coil unit and a lower flange extending horizontally from the bottom portion of said web, said lower flange being adapted to bear on said cabinet bottom wall for supporting said converter unit in its installed position within said cabinet and to be movable relative to said cabinet bottom wall for permitting removal of said converter unit from its compartment.

5. A unitary power center as set forth in claim 4 wherein said quick-release means comprises a slot in the front portion of said lower flange and a notch in the rear edge of said web of each mounting member, studs secured to and extending upwardly from said cabinet bottom wall, and lugs secured to the rear portion of said cabinet, said studs and said lugs being adapted respectively to engage said slots and notches in said mounting members for holding said power converter unit in its installed position within said compartment.

6. A unitary electrical power center as set forth in claim 5 wherein each of said studs extends upwardly above said lower flange and said quick-release means further comprises a removable pin for each of said studs, each stud including a hole therethrough for receiving one of the pins for positively holding said converter unit in its installed position.

7. A unitary electrical power center as set forth in claim 6 wherein there is vertical clearance between the lower portion of said circuit breaker box and the upper portion of said converter unit for permitting the latter to be lifted a distance sufficient for said slots in said lower flanges to clear said studs and permit said converter unit to be pulled forward for removal from the compartment.

8. A unitary electrical power center as set forth in claim 1 wherein said flange means comprises an upwardly extending flange formed along the forward portion of said top wall and a downwardly extending flange formed along the forward portion of said bottom wall.

9. A unitary electrical power center as set forth in claim 8 wherein said front door is hinged at its bottom to the front portion of said bottom wall for opening downwardly.

* * * * *